INVENTORS
RALPH N. JACKSON
WILLIAM R. MACLAY
DONALD D. METZGER
WILLIAM R. STEWART

BY George J. Metter
ATTORNEY

Jan. 31, 1967 R. N. JACKSON ETAL 3,302,067

MODULAR CIRCUIT PACKAGE UTILIZING SOLDER COATED AREAS AND SOLDER REFLOW JOINTS

Filed March 20, 1963 3 Sheets-Sheet 3

United States Patent Office 3,302,067

Patented Jan. 31, 1967

3,302,067

MODULAR CIRCUIT PACKAGE UTILIZING SOLDER COATED AREAS AND SOLDER REFLOW JOINTS

Ralph N. Jackson, and William R. Maclay, Endicott, Donald D. Metzger, Poughkeepsie, and William R. Stewart, Vestal, N.Y., assignors to International Business Machines Corporation, New York, N.Y., a corporation of New York Filed Mar. 20, 1963, Ser. No. 266,553

Claims priority, application Canada, May 11, 1962, 848,896

11 Claims. (Cl. 317—101)

The invention relates generally to electrical and electronic circuit apparatus, and in particular to a special assembly of basic circuit units to form a composite machine. The invention described herein was made in the performance of work under a NASA contract and is subject to the provisions of the National Aeronautics and Space Act of 1958, Public Law 85–568 (72 Stat. 426; 42 U.S.C. 2451), as amended.

Present day electrical circuits, and even more so electronic circuits, are being composed of extremely large numbers of components which when interconnected in the required manner form a highly complex structure. This is particularly true in electronic computers as well as certain other types of signal translating or processing equipment where the component count is frequently in the thousands and may even be in the hundreds of thousands or more. All indications are that at least near future equipment of this sort will be even more complex and consist of even greater quantities of these fundamental circuit components. Concomitant with this is an increase of problems in the areas of design, reliability, maintainability and manufacturing.

Consequently, efforts have been directed toward determining best configurations, or arrangements, of basic functional units to provide a machine which is easily manufactured and has optimum qualities when considered from the standpoint of its ultimate use. The best general approach is believed to adopt an idealization of a given machine as being composed of basic functional groupings of components, which are frequently referred to as modules. These groupings can be basic to a number of different machines, and as such made up in large quantities separately from any particular machine in which they may ultimately be included. The package assembly described herein is a modular construction of this general type.

Design of such modular based apparatus is reduced to the relatively simple task of electrically relating the functional component groupings as units rather than at the individual component level. Also, troubleshooting apparatus of this type is considerably facilitated since localizing a malfunction to one or more modules is far simpler than pinpointing specific electrical parameters which have failed.

It is, therefore, a primary object of the invention to provide a circuit package composed of integral component groupings of predetermined standard configurations.

A further object of the invention is to provide a modular circuit package easily adaptable to machine construction techniques.

Another object of the invention is the provision of such as a package having exceptional qualities of resistance to shock and vibration.

A still further object of the invention is the provision of such a package consisting of modules of identical geometry affixed to a surface of an interconnection base.

Another object is the provision of such a modular package in which the modules can be individually replaced without requiring access to portions of the mounting base other than the surface on which they are mounted.

Briefly, the invention comprises establishing basic circuit configurations in a standardized structural form, which modules are provided with conductive surface areas for making appropriate electrical connections. A special multilayer connection board has matching patterns of conductive lands arranged on a surface for receiving the modules in contiguous registering relation. The lands and areas are supplied with a thin coating of solder which are re-flowed to electrically connect the module's connection areas to the corresponding lands or connecting areas of the board and to serve a mechanically supporting function for the modules.

A further aspect is the special mounting of these circuit packages on a common base possessing an exceptionally high degree of resistance to shocks and vibrations.

The foregoing and other objects, features and advantages of the invention will be apparent from the following more particular description of a preferred embodiment of the invention as illustrated in the accompanying drawings.

Figure 4A:
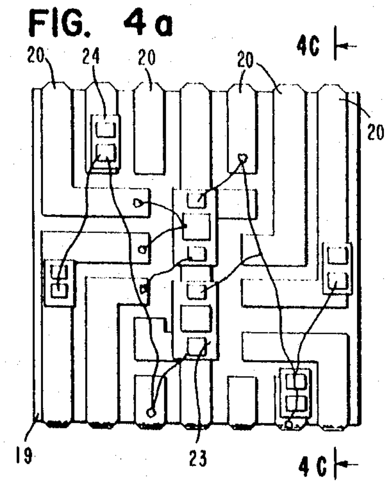
Figure 4B:
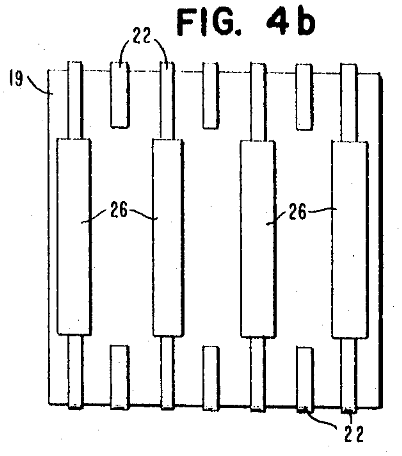
Figure 4C:
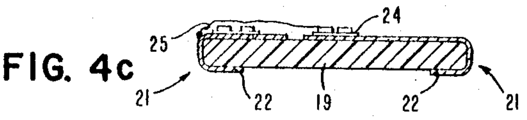
Figure 5:
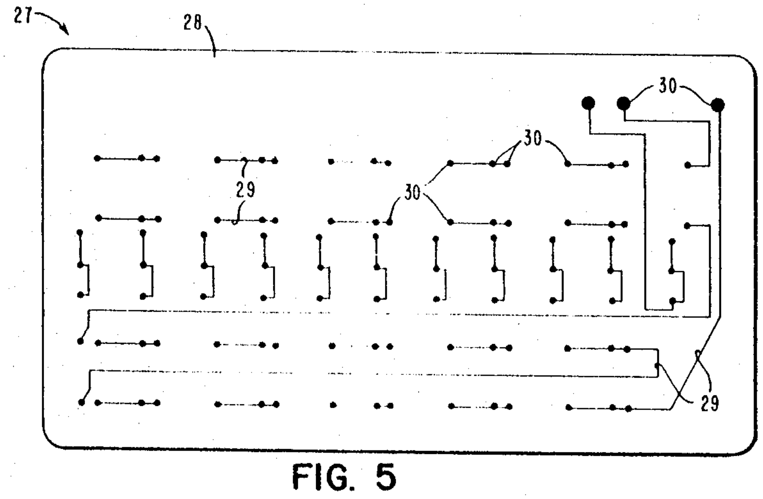
Figure 6:
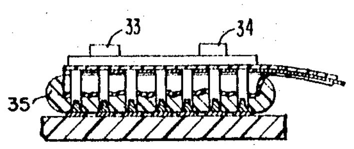

FIGS. 4(*a*) and (*b*) represent the two sides of a module used in practicing the invention;

FIG. 4(*c*) is a cross-sectional view of the module of FIG. 4(*a*) taken along the lines 4(*c*)—4(*c*) of FIG. 4(*a*);

FIG. 5 illustrates one layer of connections of the multilayer mounting board; and FIG. 6 is an enlarged perspective view of a connecting means operatively related to the mounting board.

Figure 1:
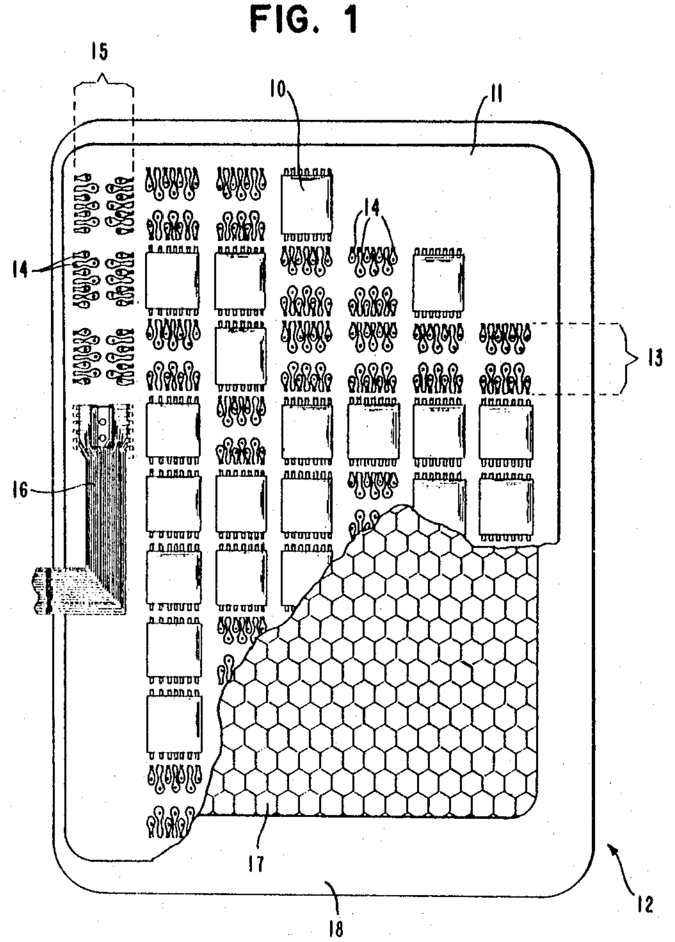
FIG. 1 is a perspective partially fragmentary view of a circuit package made in accordance with the invention.

With reference now to FIG. 1, a circuit package of the invention having exceptional resistance to shocks and vibrations and other adverse environments is shown in its major elemental aspects. A plurality of circuit modules 10 of a generally rectangular and flat shape are arranged on a mounting board 11 which includes selected interconnection leads to provide a total circuit relation of predetermined configuration. The free major surface of the mounting board is received on a suitably dimensioned surface of a base panel 12 of special construction to provide protection against mechanical vibrations and shocks and to transfer heat away from the modules.

More specifically, the upper, or outer, surface of the mounting board 11 is supplied with a number of patterns 13 each comprised of a plurality of electrically conductive lands 14, each of which patterns has overall peripheral dimensions such as to permit receiving a single module thereon in connective relationship. Also, as will be set forth in detail below, the land arrangement of each pattern and associated connecting points of a mounted module are such that the corresponding contacting points and lands are in registry when the module is received in operative relation to the board.

Specifically, each pattern includes two groups of seven lands having outwardly directed portions terminating in two spaced parallel lines. The spatial extent between the lines is slightly larger than the dimensions of a module when mounted thereon. Each group of seven lands consists of a first subgroup of four, closely adjacent its outer line of demarcation and a second subgroup of three, inwardly of the first subgroup. The staggered relation of the two subgroups permits the arrangement of a greater number of lands adjacent the edge of the module than would be the case if they were arranged lineally. This is true since although more than seven lands could be provided in a line, this would be at the expense of surface contact area and this area is at a premium here.

An initial consideration is that modules be available in different circuit forms of suitable individual characteristics for permitting cooperative association to produce a machine of desired operational capabilities. For example, in constructing a digital computer, certain basic functional requirements are common and accordingly can be represented in actual hardware either by individual modules or by selective combinations of modules. Particularly in this latter respect, it has been found that modules individually functioning as clock pulse generators, diode matrices, latches, AND gates and inverters, respectively, are the optimum fundamental units for a certain class of digital computers. It is clear that electrical correspondence must exist between the different modules, that is, actuation signals from one module must be of appropriate magnitude and wave-shape for use by another module without resort to translating equipment other than can be provided by available modules.

Having obtained the required basic modular construction for a particular type of machine, detailed module interconnections are provided by selective arrangements of leads contained within the board 11. The leads are arranged in various layers which layers are composited to form a multiply board in a way that will be set forth below. The lands are connected via special conductive links received through the boards to the lands 14 on the upper or exposed surface of the board.

A special set 15 of connecting patterns are arranged along a margin of the board 11. It is by means of the lands comprising these patterns that external connections are made, such as for example, by a multiconductor cable 16.

The panel 12 includes a central portion 17 of a relatively rigid, good heat conducting material arranged to form a plurality of cells, giving an overall honeycomb appearance. The cellular or honeycomb structure 17 is light weight, rigid and has a high natural frequency of vibration thereby offering additional protection against vibrational energy. Further, the structure 17 transfers heat from the modules and the mounting board to a metal or other good heat conducting margin 18. This heat can then be communicated to a suitable sink by either convection or conduction. In explanation of the latter, a cooling fluid can be moved past and in contact with the margin or a good heat conducting member can directly connect the margin to a suitable heat sink.

With respect to the detailed construction of a module, attention is now directed to FIGS. 4(*a*), (*b*) and (*c*) illustrating the outer or top side, the lower or mounting side and edge view, respectively, of a generalized module. The substrate 19 is generally wafer-shaped of polygonal outline, or, as shown here, rectangular. It is constructed of a hard, good electrically insulating material that is relatively unaffected by temperatures in the soldering range. An excellent material in this respect is alumina (aluminum oxide) which not only electrically insulates the different components received thereon and has the other requisite qualities, but also as well has high thermal conductivity to effectively remove heat which is generated by the different components.

A plurality of conducting stripes 20 are arranged on the outer surface of the substrate 19 and extend over a pair of opposite edges 21 in equally spaced relation and onto the backside of the substrate a limited amount inwardly of the edges as indicated at 22. Stripes of satisfactory conducting properties are provided by depositing a paste consisting of a suspension of metallic particles, such as silver, gold, platinum or combinations thereof and a glass frit in a volatile solvent, which upon firing, form good electrical conducting paths.

The upper or outer surface of the module is solder-coated to receive active electric components. For example, as illustrated, two transistors 23 are shown centrally mounted and four semiconducting diodes 24 are arranged in a suitably spaced manner, all of which are semiconductor chips without conventional hermetic seals. The transistors and diodes are bonded to plated metallic carriers or are plated directly and are secured to the conducting strips by resistance soldering and upper surface connections are provided by fine metal wires 25 of gold which are thermo-compression bonded to the semiconductor chips and which are also resistance soldered to the conducting stripes.

The upper surface of the substrate 19 carrying the transistors, diodes and interconnection wires is encapsulated in a suitable plastic or other resinous material. The purpose of this is to prevent accidental shorting out of the wires 25 and physical damage to the wires and components. The potting material should have such a coefficient of thermal expansion relative to the coefficients of the materials composing the stripes, substrate and the semiconductors that damage will not result from temperature changes.

Care must be exercised in applying the encapsulant to insure that the portions of the stripes extending over the edges of the substrate and onto the backside are kept free of the encapsulant since it is at these points that electrical connection is to be made.

Electrical resistances 26 are deposited on the backside of the module and they communicate electrically with the diodes and transistor elements of the topside by means of the wrap-around stripes. Resistances for this purpose are contemplated as being of the thick film type. Satisfactory results are obtained by depositing a suspension of silver, palladium and glass particles in a volatile solvent through a silk screen. Subsequent firing of the deposited resistance material drives off the solvent, fuzes the glass frit and stabilizes the electrical resistance properties. Control of the resistance value is determined by the suspension density, deposit thickness and area and time-temperature firing schedule. Also, resistance value can be varied by grinding or otherwise machining away deposited resistor material after firing.

The wrap-around edge parts of the stripes 20 and the portions 22 extending onto the backside of the substrate are coated with a thin film of a solder which has a melting point lower than that of the solder used to affix the transistors and diodes to the upper side. By the expression "thin film" is intended a coating of at most several thousandths of an inch, and more precisely, in the range of about 0.001 of an inch.

The multilayer board 11 is the primary interconnection means for the entire circuit package. As shown in FIG. 5, each interconnection layer 27 consists of a sheet-like base 28 of an insulative resinous material having a copper sheeting layer cemented to one surface. A suitable material for this purpose is glass cloth filled with an epoxy resin, or as an alternate, a phenolic resin could be used. Conductive leads 29 are provided by first applying an acid resistant material onto the copper sheeting in a pattern which corresponds to the desired circuit. This can be satisfactorily accomplished by either silk screen or photoresist techniques. An acid etching step removes the exposed copper while leaving the copper underneath those areas covered by the photoresist. Cleaning away the resist leaves the desired connection leads 29.

It is to be noted that the leads 29 have enlarged conductive areas 30, illustrated in the drawing as small dots. These are the points at which connections are made for electrical communication to the lands 14.

The lands of the patterns 13 and 15 are produced in the same way as the interconnection leads 29.

When all required layers 27 have been individually provided with leads 29, they are sandwiched together to form the composite board 11. The etched layers are stacked alternately with sheets of semicured epoxy resin impregnated glass cloth. Application of heat and pressure bonds the layers into a single unit. It is essential that the corresponding areas 30 of the different layers 27 be in exact registry in the final board for reasons which will be self-evident from the description that follows.

Next, openings are formed in the board at each point where an area 30 exists. In practice, as might be surmised from the discussion relative to FIG. 1, the lands 14 are arranged in repeated patterns and the holes are provided by drilling in conformity with the pattern.

The openings of the newly formed composite board are then plated by a good conductor such as copper. Plating in this manner serves to connect each of the areas 30 to their respective surface lands 14 as well as other areas also in communication with the respective openings.

Figure 2:
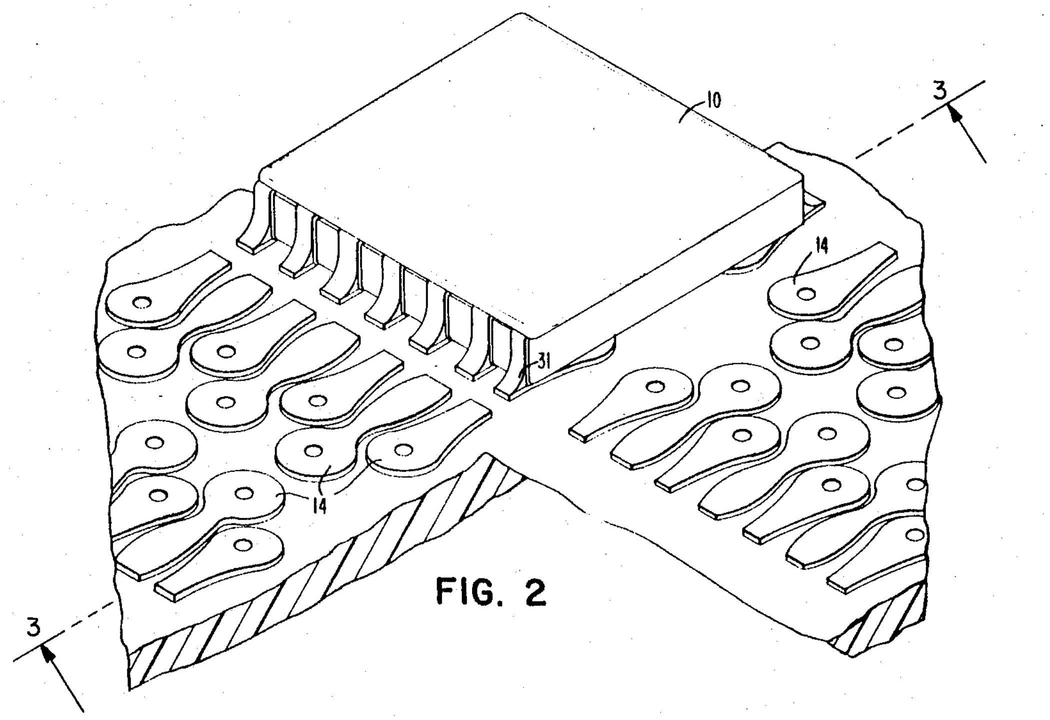
FIG. 2 is an enlarged view of a module showing its detailed positional relation to a mounting board.
Figure 3:
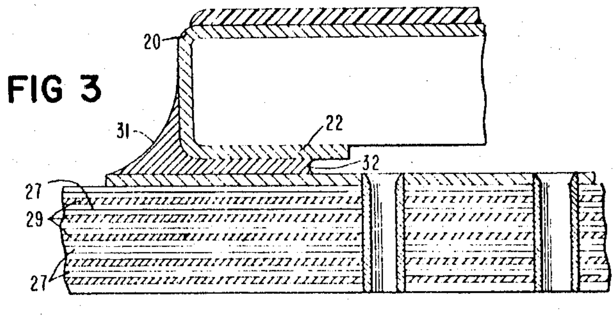
FIG. 3 is a greatly enlarged partial cross-sectional view of a module and its associated mounting board taken generally along the line 3—3 of FIG. 2.

Turning now to the details of mounting the modules to the lands as shown in FIGS. 2 and 3, each module is initially arranged in registry with an associated pattern 13, that is, so disposed on the pattern that the stripes 20 extending over the edges of the module are directly above corresponding lands of the given pattern 13 and the portions 22 are in direct contact with the individual lands. As commented on above, both the stripes and the lands have been treated so that each has a thin coating of solder. Heat is directed onto the contacting and immediately adjacent areas of the stripes and the lands such that reflow of these solder coatings is achieved which produces a sealing arrangement of each of the stripes to its associated land. These thin solder coatings reflow to form a fillet indicated generally at 31 that terminates in a feather edge at both the stripe and land ends. Also, it is to be particularly noted that the reflowed solder by the action of surface tension and adherence to the surfaces of the lands and stripes moves inwardly of the outer reaches of the module providing a supporting and electrical connection function between the portions 22 of the stripes directly facing the multilayer board 11, illustrated generally at 32. The fillets 31 serve not only to electrically connect the modules to the appropriate interconnection leads of the board, and thence to other modules and external circuits, but also serve to mechanically secure the modules to the board in a rigid integral relationship. Thus, no other physical securing members are needed such as pins, clamps, pin-and-socket arrangements, and the like, the solder fillets supplying both requirements.

The circuit package described not only can meet exceptionally high requirements with respect to resistance and shock due to its integral structure and the fact that there are substantially full lines of securing action along each of two edges of an individual module, but it also provides a unit which can be easily maintained and repaired in case of malfunction. For example, in case a total package assembly is found to be inoperative or improperly functioning in some respect, all tests and test procedures can be made on the upper or exposed surface which carries the modules. Probes for use with various test instruments can be directly applied to any one or more of the solder fillets thereby permitting ready location of a particular module which may have been damaged or otherwise fails to function properly. Having located an offending module, it can be quickly removed and replaced with a satisfactory module by reheating the solder fillets, removing the old module and by solder reflow quickly mounting the new module in operative relation to the board.

Further in this connection, it has been found that with solder coatings of several thousandths of an inch on the lands and stripes, removal and replacement can be accomplished repeatedly without deleterious effects to either the electrical connections or the physical securing aspects.

With respect to the physical strength of the solder fillets, tests on a module having stripes of approximately 0.02 inches wide and filleted to lands of commensurate dimensions, it has been found that the static strength of each fillet is approximately one pound.

In addition to providing fully interconnected circuit boards, a further important aspect, and one formerly posing considerable difficulties of a practical nature, is that of making external connections to the board. Thus, a problem of long standing in microminiature packaging has been that of making connections to such a structure where the external equipment to be connected is generally several magnitudes larger in size. Many multiconductor cables, as the cable 16, are available commercially consisting of a relatively flat pliable base member of a plastic material having a plurality of individual conductors embedded therein. Electrical connection to these cables customarily has involved utilization of a connection means, for example of the pin-and-socket variety, which is relatively large as compared to the total structure of the microminiature package. This is undesirable and for this reason external connections are directly provided at a special location on the board 11, namely at the patterns 15. These connections are made by solder fillets directly linking the cable 16 to the lands of the patterns 15.

More particularly, the cable 16 is a flat, or tape, cable where the conductors at one extremity are fanned out at right angles to the longitudinal dimension of the cable. This extremity is secured by a pair of rivets 33 and 34 to an insulative support body 35 with the ends of the conductors extending downwardly and under the body from each side with equal numbers of conductors allotted to each side of the body. The insulating plastic of the cable is omitted from the conductor material at the edges and underneath portions of the body 34 leaving these portions of the conductors bare which are then provided with a thin coating of solder. The body and bared conductors are disposed contiguously to the appropriate lands of a pattern 15 and, as before, solder reflow effects individual physical and electrical connection between each of the conductors and the associated lands. Also, as in the case of the modules, when it is necessary to remove the cable or replace it for any reason, mere application of heat permits the cable to be lifted from the pattern and repaired or replaced by a new cable.

In accordance with the present invention, a package circuit assembly can be constructed having an overall generally flat, plate-like geometry where all module connections are provided on a single outer surface. Interconnections between the various modules are provided by a multilayer interconnection board via conducting elements immediately under the body of the modules themselves thereby permitting a high module density on the surface of the multilayer mounting board and hence a high component density.

Although, the individual boards having modules mounted as described can be advantageously used alone, it has been shown that they may be packaged together on a common base to good effect. Also, it is further contemplated that several such multiple board packages can be stacked or arranged together to cooperatively form a particular machine.

Still further, the overall advantages of the described package construction permit computer design being made with reliance on a minimum number of basic devices which is immediately reflected in greater ease of application of machine production techniques.

While the invention has been particularly shown and described with reference to a preferred embodiment thereof, it will be understood by those skilled in the art that various changes in form and details may be made therein without departing from the spirit and scope of the invention.

What is claimed is:

1. A circuit package assembly comprising
a plurality of flat circuit modules having a plurality of circuit elements, each of said modules having flat conductive connection areas inwardly disposed on at least one surface of the module from an edge of said surface;

an interconnection mounting board having flat conductive connecting areas disposed on at least one predetermined surface of said board; and solder-reflow bonding means joining the connection areas of said modules and the connecting areas of said board to bond electrically and mechanically said modules to said board, said connecting areas of said board being disposed beneath said modules when said modules are bonded thereto.

2. A modular circuit package assembly comprising at least one relatively flat unitary circuit module having a plurality of circuit elements and having solderable flat conductive connection areas arranged in a predetermined pattern, said connection areas being inwardly disposed on at least one predetermined surface of said module from an edge of said surface;

an interconnection mounting board having solderable flat conductive connecting areas disposed on at least one predetermined surface of said board; and solder reflow bonding means joining the connection areas of said module and the connecting areas of said board to bond electrically and mechanically said module to said board, said connecting areas of said board being disposed beneath said module when said module is bonded thereto.

3. A modular circuit package assembly according to claim 2 wherein the connection areas of said module are further disposed on a predetermined portion of at least one side edge surface of said module; and said solder means further electrically and mechanically joins the connection areas of said module with the connecting areas of said board at said predetermined portion.

4. A modular circuit package assembly according to claim 2 further comprising a plurality of conductive members carried by said interconnecting board, and means for connecting said conductive members to the connecting areas of said board in a predetermined associative manner.

5. A modular circuit package assembly according to claim 4 wherein said board comprises a plurality of insulated layers, each of said layers having a predetermined number of said conductive members thereon, said surface on which said connecting areas of said board are disposed being the exposed surface of one of the predetermined outer layers of said board; and wherein said means for connecting further comprises an aperture at each of said connecting areas of said board, each of said apertures defining a wall-like member inwardly disposed within and into said board and being in contiguous proximal relationship with the conductive members associated with the connecting area related to the aperture, and an electrical conductive layer disposed on each of said wall-like members, each of said electrical conductive layers being in contiguous proximal relationship with the related connecting area of said board and the conductive members associated with said related connecting area.

6. A modular circuit package assembly according to claim 4 wherein said solder means comprises a reflow solder joint formed by first and second soft metal coatings applied respectively to the connection areas of said module and the connecting areas of said board, said coated areas being heat treated to provide said reflow solder joint.

7. A modular circuit package assembly comprising a plurality of flat unitary circuit modules having a plurality of circuit elements, each of said modules having solder-coated flat conductive connection areas arranged in a predetermined pattern, said connection areas of each of said modules being inwardly disposed on at least one predetermined surface thereof from an edge of said surface;

an interconnection mounting board comprising a plurality of insulated layers, each of said layers having disposed thereon a predetermined number of conductive strips, a predetermined outer surface of said board having solder-coated flat conductive connecting areas, said connecting areas benig arranged in compatible mating patterns to the patterns of the connection areas of said modules, each of said connecting areas of said boards having an aperture with a wall configuration inwardly extending into said board, each of said wall structures being plated with an electrically conductive material, each of said plated wall configurations having a preselected number of said conductive strips in contiguous proximal relationship thereto; and means for electrically and mechanically connecting said modules to said board comprising a plurality of reflow solder joints effected between the solder coated connection areas and the solder coated connecting areas of the modules and said board, respectively, said solder joints being disposed beneath said modules and along predetermined edges thereof.

8. A circuit package assembly according to claim 7 wherein preselected circuit elements of said modules are imbedded in an encapsulant, and preselected other circuit elements of said modules are encased semiconductor means.

9. A modular circuit package comprising a plurality of flat unitary circuit modules having a plurality of circuit elements, each of said modules comprising an insulated layer of non-conductive material, preselected elements of said circuit elements being arranged in a predetermined circuit arrangement and disposed on the upper surface of said layer, a plurality of flat conductive strips, each of said strips being a contiguous member and having a first portion on the upper surface of said module and an intermediary second portion on a predetermined side edge surface of said module and a third portion disposed inwardly on the lower surface of said module from an edge of said lower surface, said third portions of said strip being arranged in a predetermined pattern, and means for connecting said circuit elements with said conductive strips in a predetermined manner;

an interconnection board for mounting said modules, said interconnecting board comprising a plurality of non-conductive layers, each of said layers having a predetermined number of conductive members disposed on at least one surface thereof, a plurality of apertures inwardly disposed into said interconnecting board, each of said apertures having a plated wall configuration in contiguous proximal relationship with preselected conductive members of predetermined layers of said interconnecting board, and the exposed surface of a predetermined outer layer of said board having disposed thereon flat conductive members, each of said last mentioned conductive members being in contiguous proximal relationship with one of the plated walls of said apertures, said last mentioned conductive members being arranged in mating patterns compatible to the aforementioned patterns of said modules; and a plurality of solder reflow joints, each of said joints joining the second and third portions of a conductive strip associated with the pattern of said module to a conductive member on the outer layer surface of said board associated with the mating pattern thereof, said solder-reflow joints providing electrical and mechanical connection of said modules to said board, and each of said conductive members on said outer layer surface being substantially disposed beneath the module soldered thereto.

10. A circuit package assembly as in claim 7, in which there is further provided a vibration resistant mounting board for receiving the interconnection board thereon with the modules facing outwardly therefrom, said vibration resistant board including a honeycomb structure enclosed by a margin of a good heat conductive material.

11. A circuit package assembly as in claim 7, in which there is further provided connective means to external circuits comprising a flat multiconductor tape and solder fillet junctions formed between individual conductors of the cable and predetermined connecting areas of said board, said solder fillet junctions being disposed beneath said individual conductors to join the latter mechanically and electrically to said board.

References Cited by the Examiner

UNITED STATES PATENTS

| | | | |
|---|---|---|---|
| 2,961,746 | 11/1960 | Lyman | 174—68.5 |
| 3,059,152 | 10/1962 | Khouri | 317—101 |
| 3,102,213 | 8/1963 | Bedson et al. | 317—101 |
| 3,121,188 | 2/1964 | Foster | 317—100 |
| 3,134,930 | 5/1964 | Wright | 317—101 |
| 3,160,835 | 12/1964 | Christensen. | |
| 3,184,831 | 5/1965 | Siebertz | 29—155.5 |
| 3,201,852 | 8/1965 | Yonkers | 29—155.5 |

FOREIGN PATENTS

| | | |
|---|---|---|
| 724,379 | 2/1955 | Great Britain. |
| 775,267 | 5/1957 | Great Britain. |
| 988,075 | 4/1965 | Great Britain. |
| 1,162,092 | 9/1958 | France. |

OTHER REFERENCES

Electronic Designs, Aug. 17, 1960, p. 74.

Smith and Rickter: Making the Most of Flat Cables, Electronic Design, pp. 56–58, Oct. 14, 1959.

ROBERT K. SCHAEFER, *Primary Examiner.*

KATHLEEN H. CLAFFY, *Examiner.*

H. J. RICHMAN, J. J. BOSCO, R. S. MACON, *Assistant Examiners.*